Patented Mar. 25, 1947

2,418,047

UNITED STATES PATENT OFFICE 2,418,047

PROCESS FOR THE REMOVAL OF CARBON DISULPHIDE FROM A HYDROCARBON LIQUID

Deric William Parkes and Ian Alastair Moncrieff Ford, West Bromwich, England, assignors to Robinson Brothers Limited, Oldbury, Birmingham, England, a British company No Drawing. Application September 29, 1944, Serial No. 556,472. In Great Britain November 9, 1943.

4 Claims. (Cl. 196—32)

The removal of carbon disulphide from industrial liquids is a problem that has received considerable attention, but no solution of it that is wholly satisfactory has yet been devised. The process described in British Patent No. 467,581, which is based on the use of the piperidine salt of pentamethylene dithiocarbamic acid and magnesium oxide to form magnesium pentamethylene dithiocarbamate, is economically satisfactory, since the dithiocarbamate can be decomposed in solution by simple heating to yield the reagents for re-use. Unfortunately the speed of reaction is too low for various industrial applications, and in addition when, for example, the carbon disulphide is to be removed from crude benzole by means of aqueous solutions of the reagents, there is a tendency for emulsions to form so that it is impossible to separate the whole of the benzole from the solution of the dithiocarbamate at the end of the reaction.

As long ago as 1912 Eberhard, in British Patent No. 2,149/12, suggested the use of a primary or secondary amine and caustic soda in the presence of water. Eberhard stated that the amines simply served to catalyse the adsorption of the carbon disulphide by the alkali, and he proposed to use only a small quantity of the amine. Whatever may be the reactions which occur when the primary amines, in which Eberhard was principally interested, are used, it appears that the secondary amines do not act catalytically in the way stated. Moreover the rate of reaction in Eberhard's process is low, the shortest time mentioned for the disappearance of carbon disulphide being 1½ hours.

Our principal object is to provide a process by which substantially all the carbon disulphide can be removed rapidly by an amine which can readily be recovered for re-use.

We have now found that if a secondary amine is used alone in sufficient quantity to react with the carbon disulphide to form an amine salt of a substituted dithiocarbamic acid, or with an equivalent of a strong alkali to form the alkali salt, the speed of extraction of carbon disulphide is much greater than in the previous processes.

We have also found that the extent to which the secondary amine can be recovered for re-use depends upon the amine used and that dimethylamine presents advantages over other secondary amines in this respect.

In our invention, therefore, we use dimethylamine (with or without a strong alkali) in an amount which (taking the strong alkali into account) is sufficient to remove all or at least a substantial quantity of the carbon disulphide as dithiocarbamate from the liquid under treatment and we recover the dimethylamine for re-use from the dithiocarbamate. The liquids that can be treated in this way are benzole and other hydrocarbons.

Dimethylamine is very volatile, boiling at 7° C., so we prefer to use it in aqueous solution.

The reaction (or the probable initial reaction if an alkali is also present) is:

$$2(CH_3)_2NH + CS_2 \rightarrow (CH_3)_2N.CSSNH_2(CH_3)_2$$

The probable further reaction in the presence of caustic soda is:

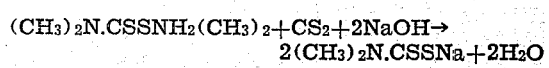

We have found that about 95 to 96% of the carbon disulphide present in crude benzole removed from coal gas is extracted from the benzole in 10 minutes when dimethylamine is used in aqueous solution, whether or not caustic soda is also used. We have also found that at the end of the reaction 99% of the dimethylamine is present as dithiocarbamate in aqueous solution and that less than 1% is lost by solution in the benzole. When, however, other secondary amines are used, either much more of the amine is lost in the benzole so that the process becomes uneconomic, or, as in the case of morpholine, the lack of volatility of the amine prevents its easy recovery in a form suitable for re-use. It is probable that the reason why other secondary amines tend to become lost in the benzole is to be found in the solubilities of the amine salt in water and benzole respectively, the dimethylamine salt being very readily soluble in water and only sparingly soluble in benzole, whereas the diethylamine salt, for example, has moderate solubility in both benzole and water. This theory is supported by the following solubility figures which we have ascertained:

| Amine | Solubility of the amine dithiocarbamate in— | |
|---|---|---|
|  | benzole | water |
|  | Per cent | Per cent |
| Dimethylamine | <0.2 | >54 |
| Piperidine | 8 | 5 to 6 |
| Diethylamine | 20 | 14 |

Since the use of one equivalent of caustic soda or other strong alkali in place of one equivalent of dimethylamine enables the amount of dimethylamine necessary to be halved, it is preferred to carry on the process with dimethylamine and caustic soda in amounts that are substantially the molar equivalents of the carbon disulphide to be extracted.

Caustic potash or lime may be used instead of caustic soda.

In general, the aim in treating any liquid is to remove as much carbon disulphide as possible, but naturally if a commercial specification demands only the reduction of the carbon disulphide to a given figure it is not necessary to add the dimethylamine (with or without alkali) in amounts greater than those required to remove the excess of carbon disulphide over this amount. In any case, once the amount of carbon disulphide to be removed is known it is desirable to ensure that the reagent or reagents are used in amounts which are the molar equivalent or equivalents of it. We find that if dimethylamine either alone or with an equivalent proportion of soda is used in excess of that required to react with the carbon disulphide, the extraction proceeds satisfactorily but some of the excess dimethylamine goes into the benzole and can only be removed by acid extraction or other procedure with involves consumption of chemicals and increases the cost of the process, and if soda is also present the excess soda is wasted. If the dimethylamine with or without an equivalent proportion of soda is insufficient to react with all the carbon disulphide to be removed, the reaction proceeds satisfactorily and the recovery of the dimethylamine is good, but of course the extraction is incomplete in proportion to the deficiency of the dimethylamine. When soda is used and is in excess in relation to the dimethylamine, the excess soda does no harm but is lost, so that its use is wasteful. When there is a deficiency of soda in relation to the dimethylamine, that is to say, the amount of soda is not the equivalent of all the dimethylamine present, the result will depend upon whether the total of dimethylamine and soda is deficient in relation to, equal to or in excess of the carbon disulphide; a total deficiency will mean incomplete extraction and a total excess will mean loss of dimethylamine in the benzole.

It is preferred to carry out the invention as a batch process, the two liquids (hydrocarbon and reagent) being agitated together in an appropriate vessel and then allowed to settle so that they can be withdrawn separately, but a continuous process may be employed if the two liquids are agitated while flowing together and the mixture is introduced into a settling tank of the type in which settling and withdrawal take place simultaneously. In either case, at the end there is clean separation of the liquid (freed from carbon disulphide) and the aqueous solution containing the sodium or other dimethyl dithiocarbamate. A continuous process involving countercurrent flow may be used but presents the disadvantage that the fresh aqueous solution of dimethylamine first comes into contact with hydrocarbon liquid containing very little carbon disulphide, so that the dimethylamine tends to enter the hydrocarbon and be carried away by it. For this reason the other methods are preferred.

The concentration of the reagents in the solution, that is to say, the amount of water present during the reaction, is found to be important with certain hydrocarbon liquids. Thus although the aqueous solution of reagents may be dilute (say 5% w.:v. of dimethylamine with an equivalent amount of soda) when the liquid to be treated is high aromatic benzole from a gasworks, it is necessary to use a higher concentration, say 14% w.:v., to remove substantially all the carbon disulphide from either low aromatic benzole from a gas-works or from $CS_2$ heads derived from a similar benzole. $CS_2$ heads is the commercial name of the fraction first removed in the fractional purification of crude benzole. With a lower concentration of reagents, the removal of carbon disulphide from either of these last two liquids is incomplete.

If the benzole or other liquid under treatment is contaminated by solid matter in suspension, slight emulsification may occur during the agitation, so a relatively long period of settling may be required if all the aqueous liquor is to be recovered or if the benzole or other liquid must be completely clean.

The amine can be recovered from the aqueous solution of the dithiocarbamate by treatment successively with an acid strong enough to decompose the dithiocarbamate and an alkali, and although this is not so economical as the simple decomposition by heating used in the process of British Patent No. 467,581 the amine recovery is complete and the additional cost is more than offset by the advantages obtained by means of the invention. In carrying out the recovery process use may be made of one molecular proportion of sulphuric acid for the decomposition of the dithiocarbamate and the liberation of the carbon disulphide, which may be removed by distillation. The amine may then be recovered by distillation with caustic soda, two molecular proportions of caustic soda being required if dimethylamine has been used alone in the treatment of the benzole or other liquid and one molecular proportion being required if one equivalent of dimethylamine has been replaced by one equivalent of strong alkali in the treatment. Naturally, if a lesser amount of strong alkali has been used in the treatment the amount of caustic soda used in the second stage of the recovery process should be adjusted accordingly. The amine may be distilled off during this second stage and condensed as an aqueous solution.

Lime may be used instead of caustic soda in the recovery process, and it has the great advantage of being cheap. It is necessary, however, to use an excess of the theoretical amount. If a minimum expenditure of chemicals is the first consideration a good way of carrying out the invention is to use dimethylamine alone, that is to say, without any strong alkali, as the extracting agent and to use lime, advantageously in the form of slurry, in the recovery process. When lime is used, bumping occurs if the distillation is effected by boiling, but this can be avoided by introducing steam into the vessel instead of supplying all the heat externally. In order to avoid loss of the very volatile dimethylamine that is distilled off, it is advisable to ensure that the walls of the vessel in which it is condensed are wet; for example at the beginning of the operation steam may be introduced into the vessel to condense on the walls and act as a solvent for the incoming dimethylamine.

Some examples will now be given:

*Example I*

550 litres of low aromatic benzole, of specific gravity 0.816 at 15° C. and extracted from gas obtained by carbonising coal in vertical retorts, were agitated for twenty minutes with 30 litres of an aqueous solution containing 4.32 kg. of dimethylamine and 3.92 kg. of sodium hydroxide, made by mixing aqueous solutions of dimethylamine and caustic soda. The mixture was allowed to settle for fifteen minutes and the two layers were separated. The upper layer consisted of 540 litres of benzole containing 0.21 kg. of carbon disulphide whereas orginally it contained 7.3 kg., a reduction of 97%.

The lower layer, consisting of a solution of sodium dimethyl dithiocarbamate, was treated with 40 litres of dilute sulphuric acid containing 244 grams of acid per litre. The carbon disulphide was removed by distillation. To the boiling solution of dimethylamine sulphate which resulted there was added gradually 10.3 litres of caustic soda solution containing 410 grams of caustic soda per litre. The whole was then distilled and the distillate collected in two receivers in series containing 2 litres and 1 litre of water respectively. The distillation was continued until the total including the water amounted to 20 litres, which contained 98.7% of the dimethylamine originally taken, and after addition of the appropriate amount of soda was ready for re-use.

*Example II*

492 litres of high aromatic benzole, of specific gravity 0.880 at 15° C. and extracted from gas obtained by carbonising coal in horizontal retorts, were agitated for thirty minutes with 111 litres of an aqueous solution containing 4.84 kg. of dimethylamine and 4.4 kg. of sodium hydroxide, prepared by mixing separate aqueous solutions of the two substances. The mixture was allowed to settle for 15 minutes and the two layers were then separated. The upper layer, consisting of 483 litres of benzole. contained 0.81 kg. of carbon disulphide against 7.75 kg. which the benzole contained originally; this was a reduction of 97.7%.

To the lower aqueous layer were added 45 litres of sulphuric acid containing 244 grams of actual acid per litre, when approximately 7.8 kg. of crude carbon disulphide were liberated and recovered by distillation of the acidified solution. This solution was next made alkaline with 12.5 litres of sodium hydroxide solution containing 387 grams per litre. The amine was recovered as in Example I.

The process was repeated, using the recovered amine and adding to it the appropriate amount of caustic soda solution. After being used five times the amine still extracted 96.5% of the carbon disulphide and amounted to 97.5% of the quantity originally taken.

*Example III*

275 litres of the same crude benzole used in Example II were agitated for ten minutes with 100 litres of an aqueous solution containing 5.19 kg. of dimethylamine. The upper layer consisting of washed benzole was separated as before, 95.5% of the original carbon disulphide content having been removed.

The lower aqueous layer was acidified with 24 litres of sulphuric acid containing 244 grams of actual sulphuric acid per litre and the carbon disulphide was removed as before. To the acid solution 5.7 kg. of calcium hydroxide in the form of slurry were added and the mixture was heated to boiling by introducing steam, while a small portion of steam was also by-passed into the condensing system. The distillate was collected in two receivers in series containing 13 and 7 litres of water respectively. Distillation was continued until the total volume of liquid in the receivers was 100 litres. 99% of the dimethylamine originally taken was found in the 100 litres of solution and could be immediately used again.

We claim:

1. In the removal of carbon disulphide from a hydrocarbon liquid, the steps which comprise reacting said liquid with dimethylamine in aqueous solution in an amount substantially the molar equivalent of the carbon disulphide to be removed to form amine dithiocarbamate, allowing the resultant mixture to settle, separating the aqueous solution containing dithiocarbamate from the hydrocarbon liquid, and recovering the dimethylamine from the aqueous solution for re-use.

2. In the removal of carbon disulphide from a hydrocarbon liquid, the steps which comprise contacting said liquid with an aqueous solution of substantially molar proportions of dimethylamine and a strong alkali to react with the carbon disulphide to be removed to form alkali dithiocarbamate, allowing the resultant mixture to settle, separating the aqueous solution containing dithiocarbamate from the hydrocarbon liquid, and recovering the dimethylamine from the aqueous solution for re-use.

3. The invention claimed in claim 1 in which the recovery of the dimethylamine is effected by treating the aqueous solution containing the dithiocarbamate successively with an acid and lime.

4. The invention claimed in claim 1 in which the recovery of the dimethylamine comprises treating the aqueous solution with lime and steam to expel the dimethylamine and condensing the expelled dimethylamine by contact with water.

DERIC WILLIAM PARKES.
IAN ALASTAIR MONCRIEFF FORD.

REFERENCES CITED

The following references are of record in the file of this patent:

UNITED STATES PATENTS

| Number | Name | Date |
|---|---|---|
| 1,986,228 | Seguy | Jan. 1, 1935 |
| 2,341,878 | Nixon et al. | Feb. 15, 1944 |
| 2,383,416 | Reed | Aug. 21, 1945 |
| 2,238,201 | Wilson et al. | Apr. 15, 1941 |

FOREIGN PATENTS

| Number | Country | Date |
|---|---|---|
| 499,678 | British | Jan. 27, 1939 |